July 2, 1963 E. E. CROISANT 3,095,624
MAP HOLDER AND CLIP
Filed April 3, 1961

INVENTOR
ELMER E. CROISANT

BY *Wright & Wright*

ATTORNEYS

United States Patent Office 3,095,624
Patented July 2, 1963

3,095,624
MAP HOLDER AND CLIP
Elmer E. Croisant, Rte. 1, Omro, Wis.
Filed Apr. 3, 1961, Ser. No. 100,258
2 Claims. (Cl. 24—66)

This invention relates to paper fasteners, holders and the like, and more particularly to a novel spring clip or holder for a folded map, providing means whereby a person can immediately observe the general area of interest on the map, as well as focusing on the specific point of interest on the map.

To my knowledge, there are a great variety of paper clips now on the market and these paper clips are of different sizes and various configurations, but to my knowledge, no clip or holder has been provided which can be associated with a road map or an air map to give sufficient weight to the map so that it will not be blown about or flutter as the result of draft created in a moving vehicle and which at the same time has provision for focusing the user's attention to a general area of interest and also providing means which will point or indicate the specific interest or place on the map.

Therefore, a primary object of my present invention is to provide a novel map holder or clip formed of a resilient wire, stamping, or of molded resilient plastic in a configuration to provide an upper body portion and a lower pair of gripping jaws of a size and configuration to sufficiently weight the map to prevent its moving about or fluttering.

Another important object of my present invention is to provide a novel map holder or clip in which the gripping jaws are formed in an enlarged generally circular shape to confine the attention of the user to a general area of the map, to eliminate fumbling and the attention required to locate the area in which one is travelling or will be of interest.

A further object of my present invention is to provide a pointer integral with said gripping jaws extending into the area confined by the jaws to locate an exact point of specific interest on the map.

Another object of my present invention is to form my novel map clip or holder with an upper loop or ring portion providing a handle to facilitate the hanging of the clip and map from a support and to aid in the general manipulation of the map.

Still another further object of my present invention is to provide means in said body portion or gripping jaws, forming opposed members for gripping the map on opposite sides and in diametrically opposite directions, thus enabling the map to be firmly retained and supported within the jaws and the clip so that the same will not slip or slide from the holder.

A further object of my present invention is to provide a novel holder or map clip which can be made to readily adapt itself to larger and longer aircraft maps, or can also readily handle the shorter car maps.

A more specific object of my present invention is to provide a spring wire map holder or clip formed from a continuous single length of wire bent to provide an upper loop or ring having legs extending from said loop or ring and opposing jaws formed to provide an enlarged lower loop with an inwardly directed pointer on each jaw so that the map can be readily slipped between the jaws and held firmly therein.

Another object of my present invention is to form my novel map holder or clip in such a manner that attachments can be readily secured thereto and particularly a magnifying glass and detachable light, so that the map reading can be enlarged and the map can be readily read at night.

A still further object of my invention is to provide a novel map holder or clip of an attractive design and one which can be placed upon the market at a reasonable cost, and which will be durable and efficient in use and will contribute greatly to the convenient reading and safety of a person using the same.

With these and other objects in view, the invention consists in the novel construction, arrangement and formation of parts, as will be hereinafter more specifically described, claimed and illustrated in the accompanying drawing, in which drawing, FIGURE 1 is a perspective view showing one form of my novel map holder or clip in operative position in relation to a map;

Figure 1:
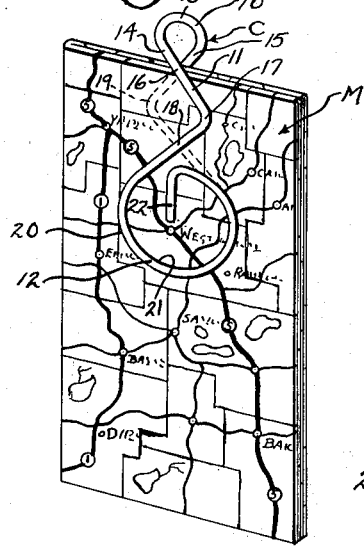

Now referring to the drawing in detail, wherein similar reference characters designate corresponding parts throughout the several views, the letter C generally indicates one form of my improved map holder or clip and the same includes broadly, a loop support member 10, the intermediate body portion 11 and the lower gripping jaws 12.

Figure 2:
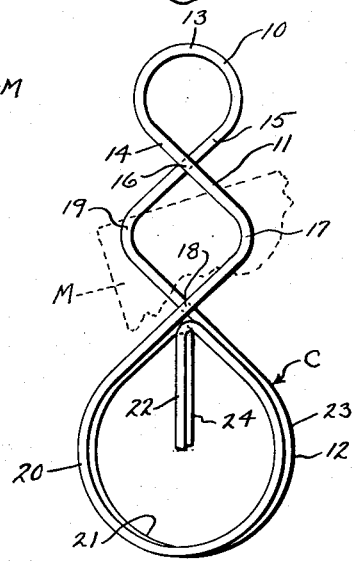
FIGURE 2 is a front elevational view of the clip shown in FIGURE 1 of the drawing, and illustrating in dotted lines how the map can be initially slipped between the gripping jaws.
Figure 3:
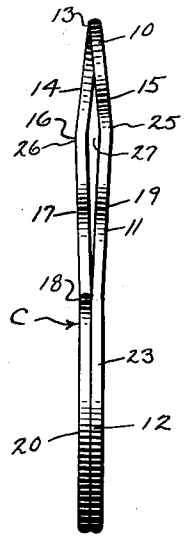
FIGURE 3 is an end elevational view of that form of my novel holder or clip shown in FIGURES 1 and 2 of the drawing.

Referring now to FIGURES 1, 2 and 3 of the drawing, it should be readily apparent that the clip is formed from a single length of resilient wire of sufficient gauge to give weight and body when the clip C is attached to the map M, as shown, and the wire is so bent to provide the upper loop or ring 10 by giving the wire a reverse bend 13. Extending from the loop is a pair of legs 14 and 15, respectively, and these legs cross one another at the point 16, as shown. Leg 15 is referred to as the under leg and leg 14 as the upper leg. Generally speaking, the wire is bent in the form shown in the shape of a figure 8, that is, the loop 10 and intermediate body portion, form substantially an "eight" in configuration. Therefore, leg 14 is again directed inwardly at the point 17 and crosses over at the point 18 its under leg 15, which of course, is also bent inwardly at the point 19. To form the lower gripping jaw portion 12 leg 14 is extended outwardly from the point 18 beyond the bend 19 and then given an arcuate bend 20 to provide an enlarged inner area 21. This arcuate portion 20 continues in a circular shape upwardly towards the point 18, and then is directed inwardly toward the center to provide a pointer 22, as shown. Likewise, leg 15 which lies under leg 14 is extended outwardly and follows the general configuration of the upper circular portion 20 to form its circular portion 23, and is then directed inwardly to provide a pointer 24 lying under the pointer 22. Thus, it can be seen that a pair of gripping jaws is provided, one jaw by the circular portion 20 and one by the circular portion 23, which jaws will firmly grip and hold the map.

It should also be noted (FIGURE 3), that leg 14 extends in a slightly upward direction to a point 25, and that the leg 15 extends in a downward direction to the point 26, thus providing a small area 27 between the legs 14 and 15 for the insertion of a corner, shown in dotted lines FIGURE 2, of the map M.

From the above, it should be readily apparent that the map can easily be inserted in the clip and then pushed downwardly between the jaws to the position shown in FIGURE 1 of the drawing, and the pointer 22 will immediately focus attention on a specific point of interest on the map, and the broad circular member 20 will confine the attention to the general immediate area of the map. As travel in relation to the map continues, it is obvious that the clip or holder can be slid along the map to any given position, and as previously mentioned, the upper loop or ring 10 is utilized to handle the map or clip and hang the same from a support, should it be desired.

It also should be noted that not only is the map firmly gripped between the jaws 12, but that additional support is given to the map by the criss-crossing of the legs 14 and 15, and the bends 17 and 19 lying on opposite sides of the map, and in diametrically opposed relation one from the other will give this additional needed support.

Figure 4:
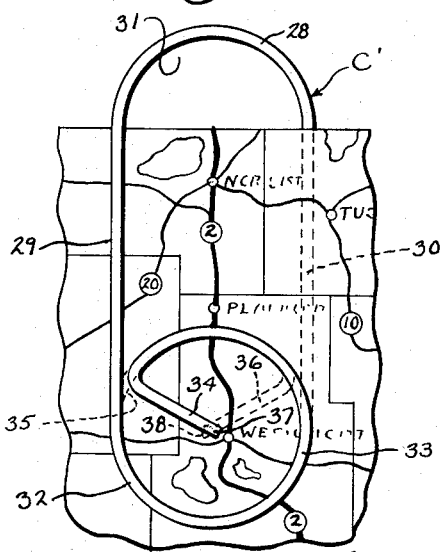
FIGURE 4 is a front elevational view in perspective of another and preferred form of my invention illustrating its position in relation to the map.
Figure 6:
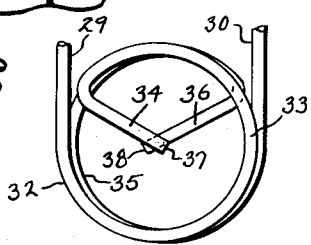
FIGURE 6 is a fragmentary front elevational view of the preferred form shown in FIGURE 4 of the drawing, and illustrating in greater detail the formation of the lower gripping jaws.

Attention is now directed to FIGURES 4 and 6 of the drawing, wherein I illustrate my preferred form of holder or clip. This form is preferred both from ease of handling and from the fact that it is easier to manufacture. In this form, the clip C' is provided with an upper loop or handle 28 and in this instance, the loop is considerably larger than the loop 10 and legs 29 and 30 depending from the loop 28 extend in a straight downward direction from the opposite sides of the loop. This, of course, gives an enlarged open area 31 and obviously, the map can be readily slipped in this large open area and then moved downwardly between the jaws 32. In any event, the upper leg 29 at its lower end is bent inwardly in a generally circular shape providing an area defined by a stretch 33. At the point where the stretch 33 is adjacent leg 29, it is bent directly toward the axial center of the circle to provide the pointer 34 and it should be noted that pointer 34 extends inwardly past the exact axial center of the stretch 33. The under leg 30 also extends parallel to leg 29 and then is bent inwardly following the general configuration of the upper stretch 33 to a point where its stretch 35 is adjacent leg 30, and then it is bent inwardly toward the axial center to form a pointer 36. Pointer 36 also extends past the axial center so that, as shown more clearly in FIGURE 6, the end terminations 37 and 38 of the pointers overlap. This overlapping is important in that the map is more firmly held not only by the jaws 32 but also by the entire length of the pointers 34 and 36, and then directly between the end portions of the pointers, as shown. This compensates for the fact that the reverse bends 17 and 19 are not found in this form of the invention. In fact, this overlapping accomplishes the same purpose as the reverse bends. Further, this overlapping aids measurably in the ease of manufacturing of the article, in that, it eliminates tangling, more particularly in the tumbling process.

Figure 5:
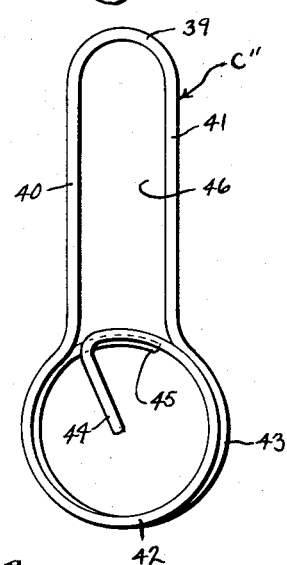
FIGURE 5 is a front elevational view of still another form of my novel holder or clip.

In FIGURE 5, I have illustrated still another form or configuration of my novel holder, and this form is somewhat of a combination of the forms shown in FIGURES 1 and 4. This clip C' is made with an upper loop 39 of about the same size as loop 10 in FIGURE 1. However, this is of a much smaller configuration than loop 28 of FIGURE 4. Depending from this upper loop 39 is a pair of legs 40 and 41. Leg 40 is directed outwardly and thence inwardly to form an upper circular jaw 42 and leg 41 lying under leg 40 is similiarly formed to provide the under jaw 43. The upper jaw 42 is provided with an inwardly directed pointer 44; however, the under or lower jaw 43 has a portion 45 which overlaps and lies under the stretch adjacent the pointer 44 to close the enlarged lower loop area completely, as shown. The use of this clip obviously is similar to the others, and the map is first inserted in the wide space or area 46, and then readily moved downwardly between the jaws 42 and 43.

All of the various configurations of my map clip have in common, an upper loop or ring for supporting and handling the clip, an intermediate body portion and an enlarged lower portion providing the gripping jaws and within which the general immediate area of the map is confined. All are provided with pointers to focus attention to a specific point on the map. However, as previously mentioned that form illustrated in FIGURES 4 and 6 of the drawing is preferred. Further, it should be understood that while I may describe my novel clip or holder as being formed from resilient wire (metal), that the same could be formed from a stamping and I also could mold or extrude the device from a plastic having resilient characteristics.

Therefore, in general use it should be noted that not only does the novel holder and clip add weight and body to the map but the lower enlarged circular loops with their center pointers encircle the general area of interest and indicate the spot of specific interest. Further, I wish to again stress that as an accessory to my novel clip or holder, I may provide a small magnifying glass and detachable light to concentrate the light and to magnify the area encircled by the loop, thus facilitating map reading at night.

It should be obvious, that my device is highly useful and will contribute to vehicle safety and driver or pilot confidence. As persons alone invariably try to check their position on a map without stopping the vehicle, this map holder will aid this checking. The device will undoubtedly be of great assistance in sportcar rallies, as it will eliminate map fumbling and permit quick concentration on the immediate location of the car. In other words, by using my novel map holder, one will be able to have a quicker reading of the map and can immediately concentrate his interest within the area encircled by the loop and pinpoint the proper or desired location with the pointer.

The map M may then be laid aside and referred to again, and as the trip or flight progresses, the clip can be slipped along the map with finger pressure so that the loop and pointer continue to indicate the general area and specific point desired.

Again, I want to stress the fact that all forms of my invention can be manufactured from a stamping or can be molded from a resilient plastic if desired. From the foregoing, it is believed that the features and advantages of my invention will be readily apparent to those skilled in the art, and it will, of course, be understood that changes in the form, proportion and minor details of the configuration may be resorted to without departing from the spirit of the invention or scope of the appended claims.

I claim:

1. A map holder and clip formed of a single continuous strip of resilient stock of sufficient gauge to materially add to the weight of a map held therein comprising an arcuate shaped upper loop portion, an intermediate body portion including, a depending leg extending downwardly from each end of said arcuate loop portion, lower depending resilient jaws of a generally enlarged circular shape to confine and surround an immediate general area of said map, each jaw being integral with a respective depending leg, and straight stretches each defining a pointer extending inwardly from each jaw toward the axial center thereof to indicate a specific point of interest on the map within the immediate general area of said map surrounded by said jaw, said straight stretches extending inwardly from opposite directions and having their end terminations overlapping, said intermediate body portion and depending legs thereof being of a sufficient length in relation to said upper loop portion and said lower resilient jaws to space said resilient jaws a substantial distance from said loop portion, whereby the immediate general area of said map confined by said jaws may lie well within the body of the map held therein.

2. A map holder and clip formed of a resilient plastic stock molded to provide an arcuate shaped upper loop portion, an intermediate body portion, including a pair of depending legs each secured to a respective end of said arcuate loop, lower depending resilient jaws at the end terminations of said legs and being of a generally enlarged circular shape to confine and surround an immediate general area of said map, and straight stretches each defining a pointer extending inwardly from each jaw towards the axial center thereof to indicate a specific point of interest on the map, said intermediate body portion and depending legs thereof being of a sufficient length in relation to said upper loop portion and said lower resilient jaws to space said resilient jaws a substantial distance from said loop portion, whereby the immediate general area of said map confined by said jaws may lie well within the body of the map held therein.

References Cited in the file of this patent

UNITED STATES PATENTS

| | | |
|---|---|---|
| 674,290 | Wright | May 14, 1901 |
| 721,071 | McGill | Feb. 17, 1903 |
| 879,007 | Root | Feb. 11, 1908 |
| 1,247,087 | De Noyer | Nov. 20, 1917 |
| 2,717,572 | Kingman | Sept. 13, 1955 |
| 2,838,817 | Wills | June 17, 1958 |
| 2,938,252 | Scheemaeker | May 21, 1960 |